US012644390B2

(12) United States Patent
Suzuki et al.

(10) Patent No.: US 12,644,390 B2
(45) Date of Patent: Jun. 2, 2026

(54) STEAM-TURBINE DAMAGE-EVALUATION APPARATUS, STEAM-TURBINE DAMAGE-EVALUATION METHOD, AND STEAM-TURBINE DAMAGE-EVALUATION PROGRAM

(71) Applicant: TOSHIBA ENERGY SYSTEMS & SOLUTIONS CORPORATION, Kawasaki (JP)

(72) Inventors: Yusuke Suzuki, Yokohama Kanagawa (JP); Kenichi Kase, Yokohama Kanagawa (JP); Yasuteru Kawai, Yokohama Kanagawa (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 272 days.

(21) Appl. No.: 18/450,649

(22) Filed: Aug. 16, 2023

(65) Prior Publication Data

US 2023/0392514 A1 Dec. 7, 2023

Related U.S. Application Data

(63) Continuation of application No. PCT/JP2022/021639, filed on May 26, 2022.

(30) Foreign Application Priority Data

May 31, 2021 (JP) ................................ 2021-090846

(51) Int. Cl.
*F01D 21/00* (2006.01)

(52) U.S. Cl.
CPC ........ *F01D 21/003* (2013.01); *F05D 2220/31* (2013.01); *F05D 2240/128* (2013.01); *F05D 2260/83* (2013.01)

(58) Field of Classification Search
CPC .......... F01D 21/003; F01D 9/04; F01D 25/00; F05D 2220/31; F05D 2240/128; F05D 2260/83
See application file for complete search history.

(56) References Cited

U.S. PATENT DOCUMENTS 6,925,418 B2 * 8/2005 Fujiyama .............. G06Q 10/06 702/182
6,928,391 B2 * 8/2005 Fujiyama .............. G06Q 10/06 702/182

(Continued)

FOREIGN PATENT DOCUMENTS

JP S60-147505 A 8/1985
JP 62-118011 A 5/1987

(Continued)

OTHER PUBLICATIONS

Japan Patent Office, International Search Report in PCT/JP2022/021639 3 pages, and English translation, 2 pages (Aug. 9, 2022).

*Primary Examiner* — Freddie Kirkland, III
(74) *Attorney, Agent, or Firm* — Finnegan, Henderson, Farabow, Garrett & Dunner, LLP

(57) ABSTRACT

A damage evaluation apparatus includes an acquisition unit configured to acquire a plurality of detection data from a plurality of sensors installed in a steam turbine, a calculation unit configured to calculate the operating state quantity of a nozzle diaphragm in the steam turbine based on a plurality of detection data, a computation unit configured to compute the creep deformation velocity of the nozzle diaphragm based on the operating state quantity, and an estimation unit configured to estimate the deformation amount of the nozzle diaphragm based on the creep deformation velocity according to a future operation plan for the steam turbine.

9 Claims, 5 Drawing Sheets

(56) References Cited

U.S. PATENT DOCUMENTS

| | | | | |
|---|---|---|---|---|
| 10,990,070 | B2 * | 4/2021 | Tomita | G06Q 10/063 |
| 12,025,014 | B2 * | 7/2024 | Tsukada | F01D 21/10 |
| 2002/0013643 | A1 | 1/2002 | Ishii et al. | |
| 2003/0191605 | A1 | 10/2003 | Fujiyama et al. | |
| 2003/0191606 | A1 | 10/2003 | Fujiyama et al. | |
| 2006/0116847 | A1 | 6/2006 | Plotts et al. | |
| 2019/0018380 | A1 * | 1/2019 | Tomita | F02C 6/00 |
| 2024/0319045 | A1 * | 9/2024 | Kawai | G01M 15/14 |

FOREIGN PATENT DOCUMENTS

| | | | |
|---|---|---|---|
| JP | H8-44421 | A | 2/1996 |
| JP | 2002-108440 | A | 4/2002 |
| JP | 2002-277382 | A | 9/2002 |
| JP | 2003-303014 | A | 10/2003 |
| JP | 2003-303243 | A | 10/2003 |

* cited by examiner

| OPERATING TIME / DEFOR-MATION AMOUNT | a hr OR MORE | a TO b hr | b hr OR LESS |
|---|---|---|---|
| A mm OR MORE | High | High | Middle |
| A TO B mm | High | Middle | Low |
| B mm OR LESS | Middle | Low | Low |

STEAM-TURBINE DAMAGE-EVALUATION APPARATUS, STEAM-TURBINE DAMAGE-EVALUATION METHOD, AND STEAM-TURBINE DAMAGE-EVALUATION PROGRAM

CROSS-REFERENCE TO RELATED APPLICATIONS

This application is a Continuation Application of No. PCT/JP2022/021639, filed on May 26, 2022, and the PCT application is based upon and claims the benefit of priority from Japanese Patent Application No. 2021-090846, filed on May 31, 2021, the entire contents of which are incorporated herein by reference.

TECHNICAL FIELD

Embodiments of the present invention relate to a damage evaluation technique for a steam turbine to be operated in a power generation plan involving large output change.

BACKGROUND

So far, thermal power generation has mainly been based on baseload operation in which continuous power generation is performed at rated operation with high energy efficiency. However, in recent years, there has been increasing demand for the thermal power generation to serve as adjustable power with respect to output change of renewable-energy power generation such as solar power generation and wind-power generation. For this reason, in the thermal power generation in recent years, the number of cases of executing partial load operation with low energy efficiency is increasing, and the number of times of start-stop is also increasing.

The main components of a thermal power plant include a steam turbine, a control valve, and a boiler, and these components are known to experience and accumulate damage and deterioration in various parts during operation, resulting in reduction in power generation performance and increase in its damage risk. One of the aspects of such damage is creep deformation of various parts and a crack to be caused by the creep deformation. The creep deformation is a phenomenon in which a metal material gradually undergoes permanent deformation over time even under low stress below its yield strength so as to be eventually cracked and broken while being used in an environment with a temperature about half of its melting point.

Regarding such creep deformation, one of the important parts in maintenance management of the steam turbine is a nozzle diaphragm, which is exposed to steam blowing at a temperature of 500° C. or higher. This is because the gaps between rotors and rotor blades adjacent to the nozzle diaphragm are designed to be as narrow as possible in order to prevent steam leakage.

If the creep deformation of the nozzle diaphragm reaches a certain amount, it contacts rotating bodies such as the adjacent rotor blade and the rotor for supporting it so as to cause damage and scattering of parts, which leads to unplanned shutdown of the thermal power plant.

For this reason, in order to prevent contact between the nozzle diaphragm and the rotating bodies, the maintenance management has been conventionally performed by: predicting the creep deformation amount of the nozzle diaphragm from databases and/or operating data; and measuring the deformation amount at the time of periodic inspection.

PRIOR ART DOCUMENT

Patent Document

[Patent Document 1] JP 2003-303014 A

SUMMARY

Problems to be Solved by Invention

In the recent thermal power plants as described above, start-stop and/or partial load operation are repeated to serve as adjustable power with respect to output change. Thus, it is more difficult to evaluate the damage risk associated with the creep deformation of the nozzle diaphragm. The conventionally executed maintenance management of the creep deformation amount of the nozzle diaphragm is a simulation based on the premise of the base load operation.

In the base load operation, in many cases, the plant is operated near the rated output where the plant efficiency is maximized. In such a case, temperature, pressure, and the like to which each nozzle diaphragm is exposed (hereinafter referred to as "the operating state quantity") are precisely evaluated and optimized at the time of designing the turbine. Since change in turbine output during operation is small, there is no need to consider change in the operating state quantity. Hence, the deformation amount of the nozzle diaphragm during the base load operation can be readily simulated from design information and operation history.

However, as the partial load operation and/or the start-stop increases, operation deviating from the design point increases. Furthermore, there are more situations where the nozzle diaphragm is exposed to temperature and/or pressure unexpected in design for a long time and the operating state quantity changes. For this reason, the conventional database and simulation for the creep deformation of the nozzle diaphragm cannot be applied as they are to the recent thermal power plant in which start-stop is repeated many times a day and the partial load operation is widely executed.

The most common method for managing the creep deformation of the nozzle diaphragm is a method of: disassembling the steam turbine during shutdown of the plant; extracting the nozzle diaphragm; and directly measuring its distortion or deformation. However, a plurality of nozzle diaphragms are disposed inside the steam turbine, and to divide the turbine is required for extracting all the nozzle diaphragms. Moreover, it takes time and effort to disassemble the individual nozzle diaphragms disposed between the rotor blades, and furthermore, it is also necessary to suspend the rotor from the turbine in order to extract the lower half of the nozzle diaphragm.

Although this method can measure the deformation amount most precisely and is a highly reliable method, this method has a problem that it takes labor and time (LT) and cost for measurement and the regular inspection period is lengthened to increase power generation cost. Although a method of measuring the gap between the nozzle diaphragm and the rotor during operation of the turbine has also been investigated, it is difficult to set up such a measurement instrument and it is also difficult to maintain high reliability for a long time under special circumstances.

In view of the above-described circumstances, an object of embodiments of the present invention is to provide a technique for simulating and precisely evaluating the creep deformation behavior of the nozzle diaphragm in the steam turbine to be operated in a power generation plan involving large output change.

DETAILED DESCRIPTION

First Embodiment

Figure 1:
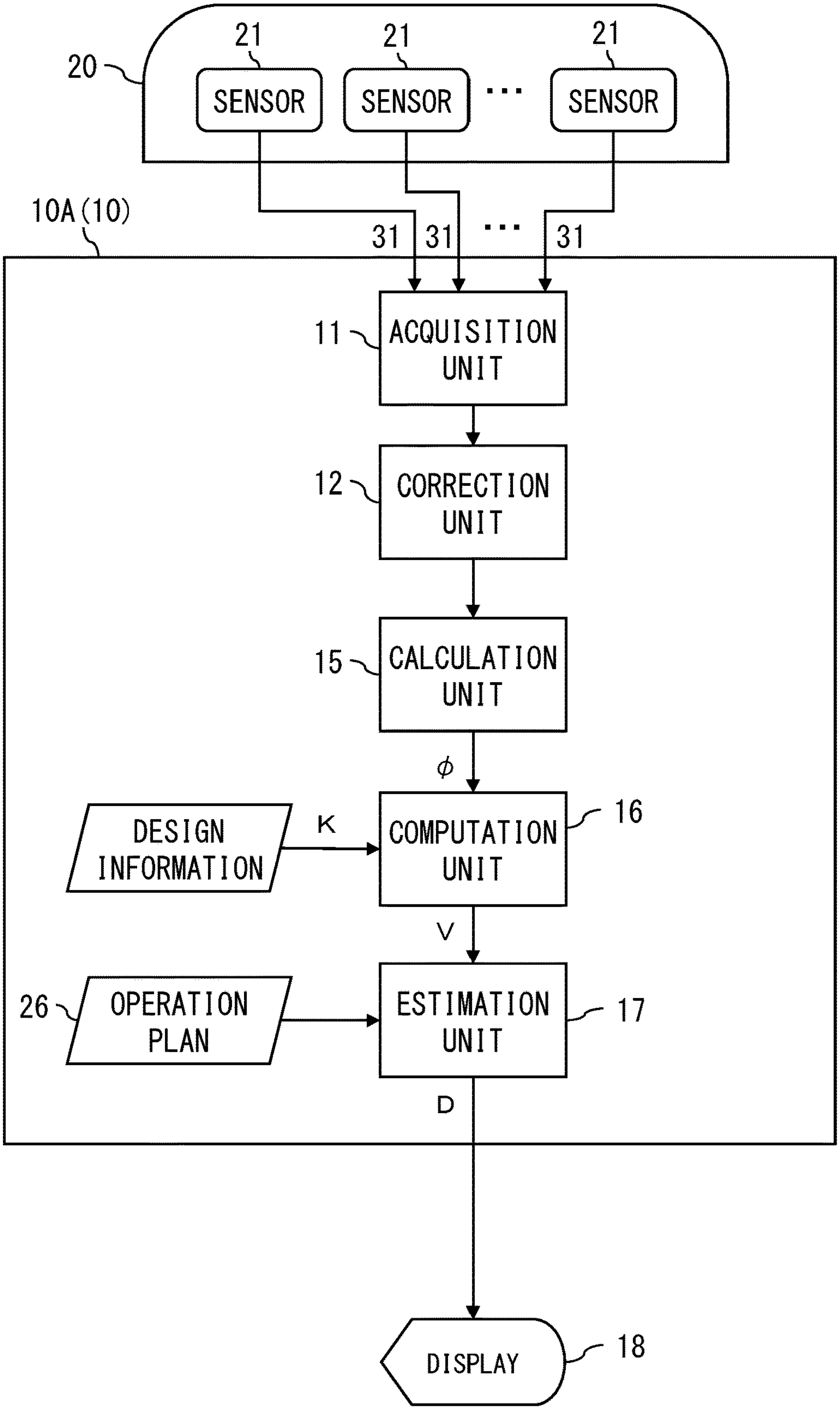
FIG. 1 is a block diagram of a steam-turbine damage-evaluation apparatus according to the first embodiment of the present invention.

Hereinbelow, embodiments of the present invention will be described by referring to the accompanying drawings. FIG. 1 is a block diagram of a damage evaluation apparatus 10A (10) of a steam turbine 20 according to the first embodiment. The damage evaluation apparatus 10A of the steam turbine 20 includes: an acquisition unit 11 configured to acquire detection data 31 from each of a plurality of sensors 21 installed in the steam turbine 20 or its periphery; a calculation unit 15 configured to calculate operating state quantity φ of a nozzle diaphragm in the steam turbine 20 on the basis of these detection data 31; a computation unit 16 configured to compute creep deformation velocity V of the nozzle diaphragm on the basis of the operating state quantity φ; and an estimation unit 17 configured to estimate deformation amount D of the nozzle diaphragm from the creep deformation velocity V on the basis of a future operation plan 26 for the steam turbine 20.

Nozzle diaphragms (not shown) are components that are installed between respective stages of rotor blades arranged in a plurality of rows in the steam turbine 20. As to the nozzle diaphragms, a plurality of nozzle plates (stator-blade plates) are circumferentially arranged so as to face the rotor blades arranged on the rotor surface.

Further, the inner circumferential side and the outer circumferential side of these nozzle plates are supported by ring-shaped structures that are called an inner ring and an outer ring. The nozzle plates, the inner ring, and the outer ring are fixed by welding or the like, and have a structure that can be divided at 0° and 180° positions. The nozzle diaphragms having such a divided structure are installed so as to sandwich the rotor from above and below, and thus, can be installed between the stages of the rotor blades embedded in the rotor.

The nozzle diaphragms are designed in such a manner that the steam having passed through the rotor blades on the upstream side passes between the nozzle plates, and have a function of guiding the steam to the rotor blades on the downstream side at an appropriate flow rate. Because of this function, pressure difference is caused in the steam between the upstream side and the downstream side of the nozzle diaphragm. Furthermore, the nozzle diaphragms are used in a high-temperature region, and thus, the pressure difference from the outer-ring side supported by a turbine casing tends to cause creep deformation in which the inner-ring side tilts toward the downstream side of the steam.

The plurality of sensors 21 are installed in the steam turbine 20 or its periphery, and output the detection data 31 such as: temperature and pressure on the respective steam-inlet and steam-outlet sides of the steam turbine 20; extracted steam temperature; and extracted steam pressure. Aside from these data, the sensors 21 also output: the detection data 31 such as temperature and pressure in front of and behind the steam valve; and the detection data 31 of the turbine casing and the steam-valve casing to which it is installed. The sensors 21 also include those installed in apparatuses (not shown) other than the steam turbine 20 in the power plant, such as generator output, and also output the detection data 31 in those apparatuses.

The acquisition unit 11 sequentially acquires the detection data 31 to be continuously outputted every moment from each of the plurality of sensors 21 at an appropriate sampling frequency. When the steam turbine 20 is started from the stopped state, the steam turbine 20 goes through a transient state and then transitions to a steady state in which the power output becomes constant. Additionally, in some cases, the steam turbine 20 transitions from one steady state to another steady state or is shut down in response to a request for output adjustment. Also in such a case, it passes through the transient state. In addition, the steady state after transition is also broadly classified into rated operation with high energy efficiency and partial load operation with low energy efficiency.

As the operating state of the steam turbine 20 changes frequently in this manner, the creep deformation velocity experienced by each nozzle diaphragm also changes. Thus, it can be said that the detection data 31 acquired by the acquisition unit 11 is information to be directly reflected in the behavior of the creep deformation in each nozzle diaphragm. These detection data 31 are then subjected to correction such as averaging and noise removal in a correction unit 12 so as to be properly processed in the post-processing.

The calculation unit 15 calculates a heat balance of the steam turbine 20 on the basis of these detection data 31. The heat balance indicates a distribution state of thermal energy in each of the components of the steam turbine 20 (including the nozzle diaphragms).

In other words, on the basis of the detection data 31, the calculation unit 15 calculates and outputs the operating state quantity φ such as temperature, pressure, enthalpy, and flow rate that are related to at least the nozzle diaphragms among these components. Note that the method of calculating the operating state quantity φ of such nozzle diaphragms is not limited to the method based on the heat balance of the steam turbine 20 but may be based on another calculation method.

In the calculation unit 15, specifically, on the basis of the detection data 31 outputted by the temperature sensors 21 installed on the inlet side and outlet side of the steam turbine 20 and the like, the heat balance in each stage of the steam turbine 20 is determined by balance calculation. Depending on the type and number of nozzle diaphragms constituting the steam turbine 20, it is difficult in some cases to apply all of the sequentially acquired detection data 31 to the calculation processing of the heat balance.

In such a case, the heat balance of the evaluation site (nozzle diaphragm) is stored in a database (not shown) in advance so as to correspond to the assumed detection data 31, and the operating state quantity φ corresponding to the detection data 31 acquired by the acquisition unit 11 may be sequentially outputted from this database as calculation processing.

The computation unit 16 computes the creep deformation velocity V of the nozzle diaphragm on the basis of: the operating state quantity φ of the nozzle diaphragm obtained from the calculation result of the heat balance; and design information K of the nozzle diaphragm. Additionally or alternatively, a dataset of the creep deformation velocity V and the operating state quantity φ of the nozzle diaphragm may be constructed so that the computation unit 16 outputs the corresponding creep deformation velocity V for inputted arbitrary operating state quantity φ. For the creep deformation velocity V to be computed in the above-described case, it is sufficient to compute only the directional component along the rotation axis of the steam turbine 20.

The estimation unit 17 can estimate the deformation amount D of the nozzle diaphragm at the current time point by integrating the creep deformation velocity V to be outputted from the computation unit 16 in real time. Further, the future deformation amount D of the nozzle diaphragm can also be estimated on the basis of: the operating time estimated from the future operation plan 26 of the steam turbine 20; and the creep deformation velocity V. The operation plan 26 is, for example, a facility availability factor, average output, and frequency of the number of start-stop.

The display 18 (FIG. 5) displays the creep deformation amount D of the nozzle diaphragm with respect to the operating time t of the steam turbine 20. On the basis of the creep deformation velocity V to be calculated in real time, the creep deformation amount D at the current time point is shown as "the actual calculation results". Further, on the basis of the operation plan 26, the creep deformation amount D in the future is shown as "the future prediction".

As described above, on the basis of "the actual calculation results" at the current time point and the creep deformation amount D in "the future prediction", an effective maintenance recommendation timing for the nozzle diaphragm designed with small margin of gaps can be proposed.

Second Embodiment

Figure 2:
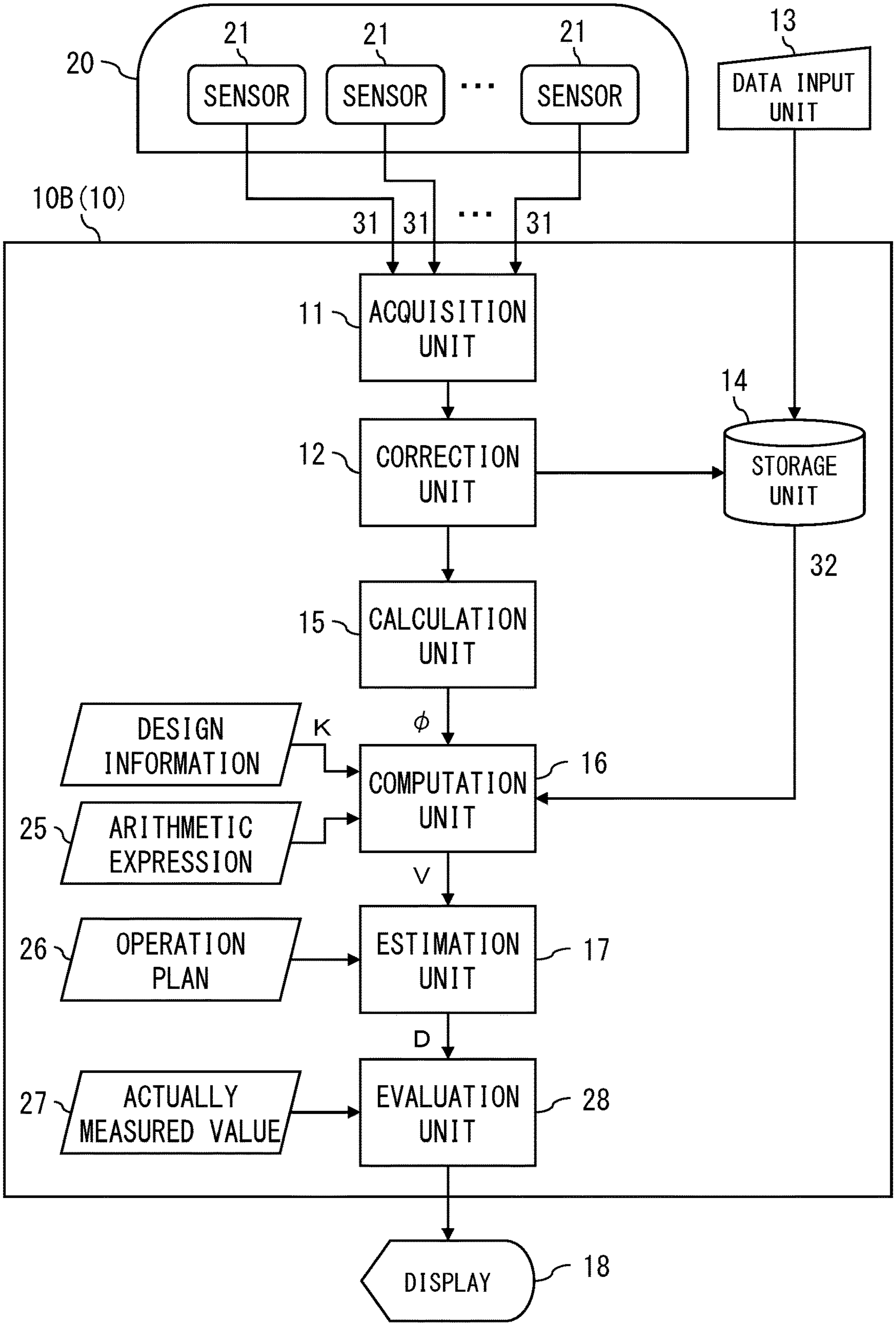
FIG. 2 is a block diagram of the steam-turbine damage-evaluation apparatus according to the second embodiment.

Next, the second embodiment of the present invention will be described by referring to FIG. 2. FIG. 2 is a block diagram of a steam-turbine damage-evaluation apparatus 10B (10) according to the second embodiment. In FIG. 2, the components having the same configuration or function as those in FIG. 1 are denoted by the same reference signs, and duplicate description is omitted.

The damage evaluation apparatus 10B of the second embodiment has the functions of: the acquisition unit 11 for the detection data 31; the heat-balance calculation unit 15 for outputting the operating state quantity φ; the computation unit 16 for the creep deformation velocity V; and the estimation unit 17 for the deformation amount D, similarly to the damage evaluation apparatus 10A of the first embodiment.

The creep deformation velocity V in the damage evaluation apparatus 10B of the second embodiment is calculated on the basis of: the detection data 31 acquired in real time similarly to the first embodiment; and historical data 32 that are acquired by integrating the detection data 31 obtained in the past.

The historical data 32 are formed by: correcting the detection data 31 acquired in real time in the correction unit 12; and then accumulating the corrected data in an storage unit 14. Thus, the historical data 32 are the integrated data for the entire operating period from the start of operation of the steam turbine 20.

The historical data 32 can also be externally inputted from a data input unit 13, and this is to cope with a case where the damage evaluation apparatus 10B is operated with the existing steam turbine 20 having been in operation for a certain length of time. The creep deformation velocity V can be computed with higher reliability by reflecting such historical data 32.

Figures 3, 4:
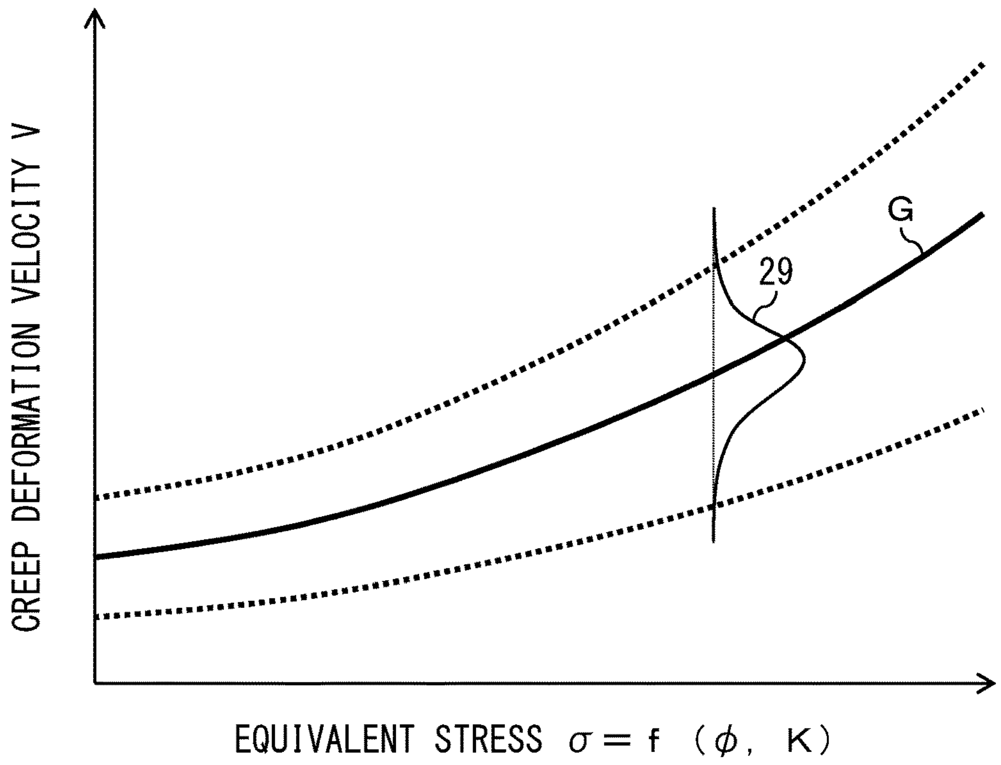
FIG. 3 is a graph illustrating relationship between equivalent stress acting on a nozzle diaphragm and creep deformation velocity.
FIG. 4 is a damage-risk evaluation table illustrating occurrence frequency of deformation amount of the nozzle diaphragm with respect to operating hours of the steam turbine.

FIG. 3 is a graph illustrating the relationship between equivalent stress σ acting on the nozzle diaphragm and the creep deformation velocity V. This graph is generated such that it can be universally applied to structures composed of common materials without being limited to the nozzle diaphragm to be evaluated.

The computation unit 16 (FIG. 2) of the damage evaluation apparatus 10B computes the creep deformation velocity V on the basis of the equivalent stress σ of the nozzle diaphragm derived from the operating state quantity φ. In other words, the computation unit 16 inputs the design information K and the operating state quantity φ of the nozzle diaphragm into an arithmetic expression 25, and thereby computes the equivalent stress σ to be generated in this nozzle diaphragm.

For this equivalent stress σ, the arithmetic expression is determined on the basis of the creep deformation behavior of the nozzle diaphragm by using elastic theory or elastic creep theory as the stress representing the creep deformation amount. When it is difficult to obtain the arithmetic expression of the equivalent stress σ by using these theoretical expressions, an approximate expression of a stress parameter representing the creep deformation amount can be obtained in advance by using a finite element method or the like. The function G representing the creep deformation velocity V can also be defined for the equivalent stress σ with a certain width, such as probability distribution 29, by considering variations in materials such as creep strength.

$$\text{Equivalent Stress}\,\sigma=f(\varphi,K)$$

$$\text{Creep Deformation Velocity}\ V=G(\varphi,K,\sigma)=A\cdot\sigma^B$$

In the above expressions, A and B are constants determined by φ and K. Assuming deformation of the nozzle diaphragm, it may be determined from the elastic theory or the elastic creep theory or determined by using the finite element method, similarly to the above-described arithmetic expression f for obtaining the equivalent stress σ.

Although the creep deformation velocity V is obtained by the power law of the equivalent stress σ in the present embodiment, other prediction expressions are also applicable. Since the shape of the nozzle diaphragm differs for each plant and for each turbine stage, a prediction expression suitable for each nozzle can be applied. In any of these prediction expressions, the constants to be used in the expression are determined from φ and K.

FIG. 4 is a damage-risk evaluation table illustrating occurrence frequency of the deformation amount D of the nozzle diaphragm with respect to operating hours of the steam turbine Although this evaluation table classifies the occurrence frequency into the three stages including "High", "Middle", and "Low", there is no particular limitation to this display method.

The damage evaluation apparatus 10B (FIG. 2) includes an evaluation unit 28 configured to evaluate the damage risk of the nozzle diaphragm on the basis of the creep deformation amount D estimated by the estimation unit 17. Since the creep deformation velocity V is represented with respect to the equivalent stress σ as the probability distribution 29 (FIG. 3), as shown in FIG. 4, the damage risk of the nozzle diaphragm can be evaluated by the occurrence frequency on the basis of the deformation amount D and the operating time t. Note that each threshold value (A, B, a, b) shown in FIG. 4 can be determined in advance by the design information K such as dimensions and the material of the nozzle diaphragm.

The deformation amount D of the nozzle diaphragm is calculated from the real-time detection data 31 of the sensors 21. However, in this case, there is a concern that a prediction error due to variations in the material strength of the nozzle diaphragm may be included in the deformation amount D. This error increases proportionally as the operating time increases. Thus, as shown in the damage-risk evaluation table (FIG. 4), appropriate risk evaluation can be realized by evaluating the damage risk on the basis of two parameters including the deformation amount D and the operating time t.

In the second embodiment, a description has been given of the method in which the evaluation unit 28 causes the display 18 to display the damage-risk evaluation table (FIG. 4) based on the matrix of two parameters. However, the damage risk evaluation by the evaluation unit 28 is not necessarily limited to such a method. For example, availability factors and average operating temperature of apparatuses, number of times of start-stop may be used as parameters, and damage probability can be calculated by using a probabilistic method instead of uniquely determining the risk by the matrix and the parameters.

Figure 5:
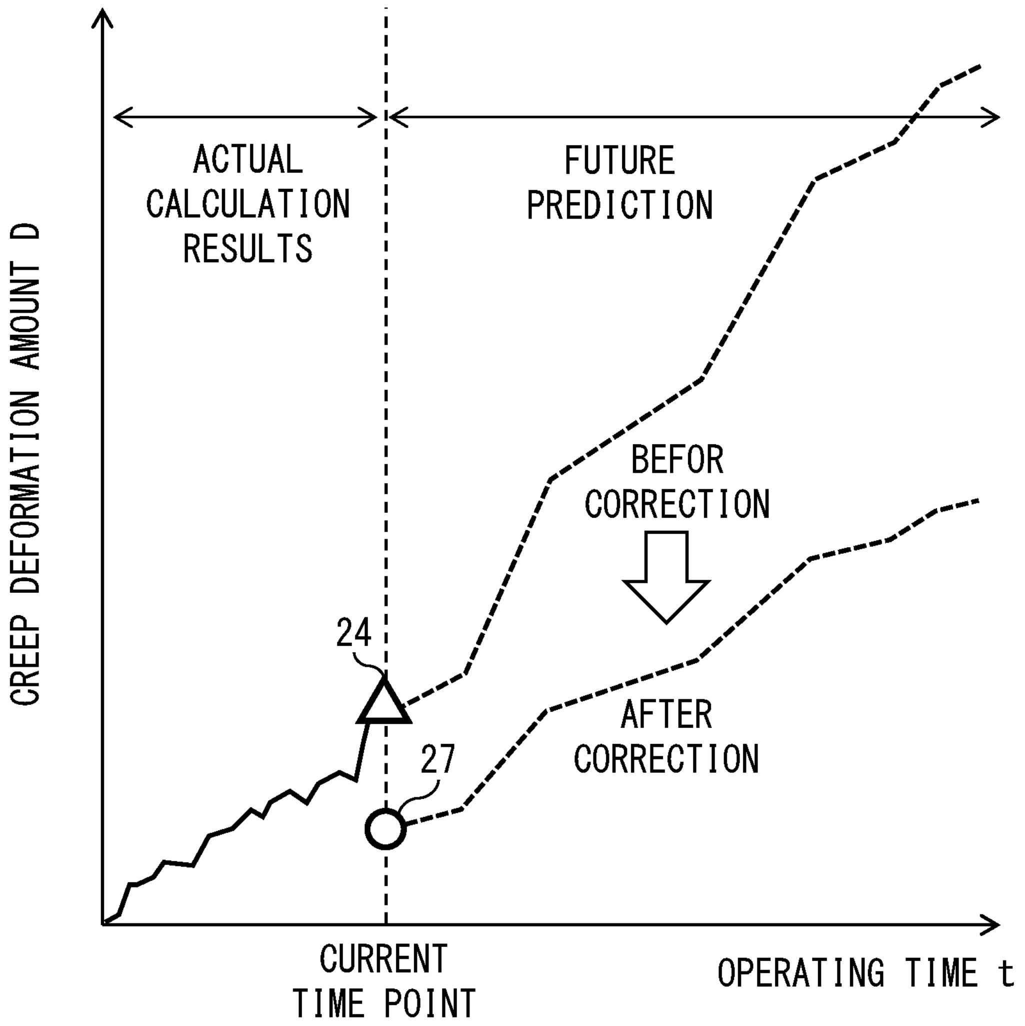
FIG. 5 is a damage-risk evaluation graph illustrating a future prediction of the creep deformation amount of the nozzle diaphragm.

FIG. 5 is a damage-risk evaluation graph illustrating a future prediction of the creep deformation amount D of the nozzle diaphragm. As described above, the damage risk can be evaluated by correcting the computation-based estimated value 24 of the creep deformation amount D with the use of the actually measured value 27 of the nozzle diaphragm.

In other words, the accuracy of the future prediction can be improved by reflecting the information of the actually measured value 27 obtained in visual inspection performed during shutdown of the steam turbine 20 and the like. The deviation between the estimated value 24 of the creep deformation amount D outputted from the estimation unit 17 in advance and the actually measured value 27 in inspection is quantified, and the future damage prediction line is corrected depending on the deviation as indicated by the arrow.

Figure 6:
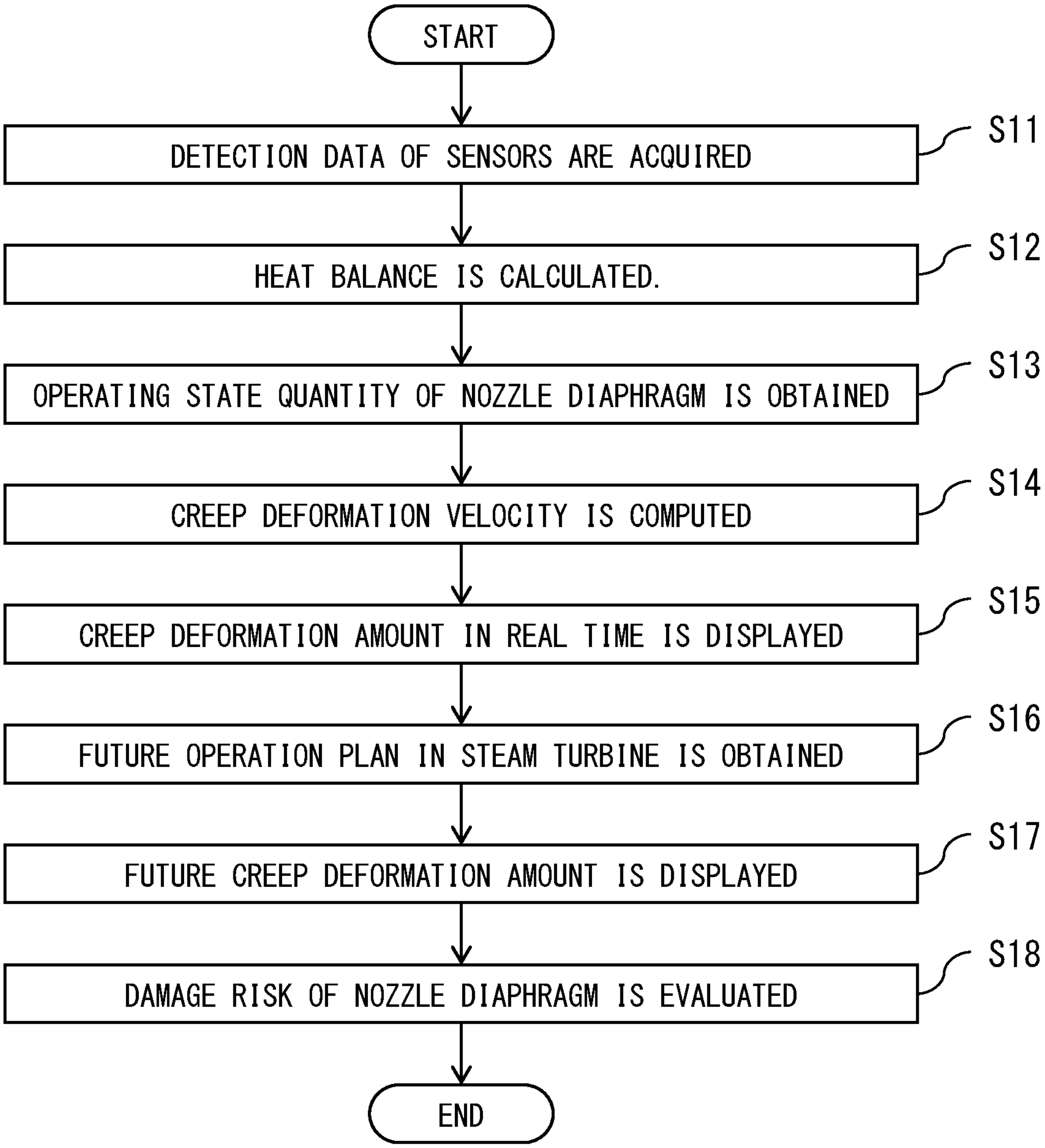
FIG. 6 is a flowchart illustrating steps of a steam-turbine damage-evaluation method and algorithm of a steam-turbine damage-evaluation program according to one embodiment.

Next, a description will be given of the steps of the steam-turbine damage-evaluation method and the algorithm of the steam-turbine damage-evaluation program according to the embodiment on the basis of the flowchart of FIG. 6 by referring to FIG. 2 as required.

First, in the step S11, the detection data 31 are acquired from each of the plurality of sensors 21 installed in the steam turbine 20 or its periphery.

In the next step S12, the heat balance of the steam turbine 20 is calculated on the basis of these detection data 31.

On the basis of the operating state quantity φ of the nozzle diaphragm obtained in the step S13 from the calculation result of the heat balance, the creep deformation velocity V of the nozzle diaphragm is computed in the step S14. This creep deformation velocity V is computed also on the basis of the historical data 32 obtained by integrating the past detection data 31 as necessary.

In the step S15, the creep deformation amount D of the nozzle diaphragm in real time is displayed by integrating the computed creep deformation velocity V.

On the basis of the future operation plan 26 for the steam turbine 20 (in the step S16), the future creep deformation amount D of the nozzle diaphragm is estimated from the past record of the creep deformation velocity V and displayed in the step S17.

On the basis of this future creep deformation amount D, the damage risk of the nozzle diaphragm is evaluated in the step S18, and the recommended timing for maintenance of the nozzle diaphragm is presented (END).

According to the steam-turbine damage-evaluation apparatus of at least one embodiment described above, the creep deformation behavior of the nozzle diaphragm in the steam turbine to be operated in a power generation plan involving large output change can be precisely evaluated under simulation by computing the creep deformation velocity of the nozzle diaphragm in real time on the basis of the heat balance of the steam turbine calculated from the detection data of a plurality of installed sensors.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The above-described steam-turbine damage-evaluation apparatus includes: a controller in which processors such as a dedicated chip, an FPGA (Field Programmable Gate Array), a GPU (Graphics Processing Unit), and a CPU (Central Processing Unit) are highly integrated; a memory such as a ROM (Read Only Memory) and a RAM (Random Access Memory); an external storage device such as a HDD (Hard Disk Drive) and an SSD (Solid State Drive); a display; an input device such as a mouse and a keyboard; and a communication interface. The steam-turbine damage-evaluation apparatus can be realized by general computer-based hardware configuration. Thus, components of the steam-turbine damage-evaluation apparatus can be achieved by processors of a computer and can be operated by a steam-turbine damage-evaluation program.

In addition, the steam-turbine damage-evaluation program may be provided in the form of being pre-embedded in a ROM and the like. Additionally or alternatively, this program can be provided as an installable or executable file stored in a computer-readable storage medium such as a CD-ROM, a CD-R, a memory card, a DVD, and a flexible disk (FD).

Moreover, the steam-turbine damage-evaluation program according to the present embodiment may be stored on a computer connected to a network such as the Internet so as to be provided by being downloaded via the network. Furthermore, the steam-turbine damage-evaluation apparatus can also be configured by: interconnecting separate modules, which independently achieve the respective functions of the components, via a network or dedicated lines; and using these modules in combination.

The invention claimed is:

1. A steam-turbine damage-evaluation apparatus configured to evaluate behavior of a nozzle diaphragm of a steam turbine, comprising:

an acquisition unit configured to acquire a plurality of detection data from a plurality of sensors attached to the steam turbine and its periphery at predetermined positions;

a calculation unit configured to calculate operating state quantity of the nozzle diaphragm of the steam turbine based on the plurality of detection data;

a computation unit configured to compute creep deformation velocity of the nozzle diaphragm based on the operating state quantity; and an estimation unit configured to estimate a deformation amount of the nozzle diaphragm based on the creep deformation velocity according to a future operation plan for the steam turbine, wherein the plurality of sensors is configured to detect the plurality of detection data with respect to at least one of a steam inlet side and a steam outlet side of the steam turbine and an extracted steam from the steam turbine, and wherein the calculation unit is configured to calculate the operating state quantity according to a heat balance of the steam turbine, which reflects temperature at the steam inlet side and the steam outlet side of the steam turbine, based on the plurality of detection data.

2. The steam-turbine damage-evaluation apparatus according to claim 1, wherein the creep deformation velocity is computed based on historical data representing the plurality of detection data detected in past in addition to the plurality of detection data detected in real time.

3. The steam-turbine damage-evaluation apparatus according to claim 2, wherein the historical data are provided externally.

4. The steam-turbine damage-evaluation apparatus according to claim 1, wherein the creep deformation velocity is computed based on an equivalent stress of the nozzle diaphragm derived from the operating state quantity.

5. The steam-turbine damage-evaluation apparatus according to claim 1, further comprising an evaluation unit configured to evaluate a damage risk of the nozzle diaphragm based on the deformation amount of the nozzle diaphragm estimated by the estimation unit.

6. The steam-turbine damage-evaluation apparatus according to claim 5, wherein an occurrence frequency is determined with respect to the deformation amount of the nozzle diaphragm, which is varied responsive to the creep deformation velocity having a probability distribution relative to an equivalent stress of the nozzle diaphragm and an operation time of the steam turbine, thus evaluating the damage risk of the nozzle diaphragm based on the occurrence frequency.

7. The steam-turbine damage-evaluation apparatus according to claim 5, wherein the damage risk is evaluated by correcting an estimated value of the deformation amount of the nozzle diaphragm, which is estimated by the estimation unit based on the creep deformation velocity, with a measured value of the nozzle diaphragm.

8. A steam-turbine damage-evaluation method for evaluating behavior of a nozzle diaphragm of a steam turbine, comprising:

acquiring a plurality of detection data from a plurality of sensors attached to the steam turbine and its periphery at predetermined positions;

calculating operating state quantity of the nozzle diaphragm of the steam turbine based on the plurality of detection data;

computing creep deformation velocity of the nozzle diaphragm based on the operating state quantity; and estimating deformation amount of the nozzle diaphragm based on the creep deformation velocity according to a future operation plan for the steam turbine, wherein the plurality of sensors is configured to detect the plurality of detection data with respect to at least one of a steam inlet side and a steam outlet side of the steam turbine and an extracted steam from the steam turbine, and wherein the operating state quantity is calculated according to a heat balance of the steam turbine, which reflects temperature at the steam inlet side and the steam outlet side of the steam turbine, based on the plurality of detection data.

9. A non-transitory computer-readable storage medium storing a steam-turbine damage-evaluation program adapted to a steam-turbine damage-evaluation apparatus configured to evaluate behavior of a nozzle diaphragm of a steam turbine, the steam-turbine damage-evaluation program being executable by at least one processor to perform steps of:

acquiring a plurality of detection data from a plurality of sensors attached to the steam turbine and its periphery at predetermined positions;

calculating operating state quantity of the nozzle diaphragm of the steam turbine based on the plurality of detection data;

computing creep deformation velocity of the nozzle diaphragm based on the operating state quantity; and estimating deformation amount of the nozzle diaphragm based on the creep deformation velocity according to a future operation plan for the steam turbine, wherein the plurality of sensors is configured to detect the plurality of detection data with respect to at least one of a steam inlet side and a steam outlet side of the steam turbine and an extracted steam from the steam turbine, and wherein the operating state quantity is calculated according to a heat balance of the steam turbine, which reflects temperature at the steam inlet side and the steam outlet side of the steam turbine, based on the plurality of detection data.

* * * * *